US006903487B2

(12) United States Patent
Shreeve et al.

(10) Patent No.: US 6,903,487 B2
(45) Date of Patent: Jun. 7, 2005

(54) MICRO-MIRROR DEVICE WITH INCREASED MIRROR TILT

(75) Inventors: Robert W. Shreeve, Corvallis, OR (US); Eric Lee Nikkel, Philomath, OR (US); Michael John Regan, Corvallis, OR (US); Sam G. Angelos, Jr., Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 173 days.

(21) Appl. No.: 10/367,156

(22) Filed: Feb. 14, 2003

(65) Prior Publication Data

US 2004/0160143 A1 Aug. 19, 2004

(51) Int. Cl.[7] .......................... H02N 1/00; G02B 26/08
(52) U.S. Cl. ...................... 310/309; 359/290; 359/224
(58) Field of Search .................. 310/309; 359/223–226, 359/291

(56) References Cited

U.S. PATENT DOCUMENTS

| 4,662,746 A | 5/1987 | Hornbeck | 359/223 |
|---|---|---|---|
| 4,956,619 A | 9/1990 | Hornbeck | 359/317 |
| 5,061,049 A | 10/1991 | Hornbeck | 359/224 |
| 5,083,857 A | 1/1992 | Hornbeck | 359/291 |
| 5,212,582 A * | 5/1993 | Nelson | 359/224 |
| 5,583,688 A | 12/1996 | Hornbeck | 359/291 |
| 5,650,881 A | 7/1997 | Hornbeck | 359/871 |

(Continued)

FOREIGN PATENT DOCUMENTS

| JP | 06-230295 | * 8/1994 | G02B/26/08 |
|---|---|---|---|
| JP | 2001147385 | 5/2001 | G02B/26/08 |
| WO | WO 0025160 | 5/2000 | G02B/6/26 |
| WO | WO 0165292 | 9/2001 | G02B/6/35 |

OTHER PUBLICATIONS

Alexander Wolter et al., "Fabrication of the Moving Liquid Mirror (MLM) Spatial Light Modulator in a Standard CMOS–Process", SPIE vol. 4178 (2000), pp. 246–254.
Alexander Wolter et al., "The Moving Liquid Mirror (MLM) Spatial Light Modulator: Simulation and Measurement of the Optical Performance", MEMS–vol. 2, Micro–Electro–Mechanical Systems (MEMS) (2000), pp. 437–442.
H. Togo et al., "Multi–Element Thermo–Capillary Optical Switch and Sub–Nanoliter Oil Injection for its Fabrication", 1999 IEEE, pp. 418–423, Jan. 1999.
Michael Pycraft Huges, "AC Electrokinetics: Applications for Nanotechnology", Seventh Foresight Conference on Molecular Nanotechnology, Nov. 30, 1999, pp. 1–16, retrieved from the Internet: [http://www.Foresight.org/Conferences/ MNT7/Papers/Hughes/].
A. Feinerman et al., "Fast Micro–Mirrors With Large Angle Deflections", 25 pgs., retrieved from the Internet: [http://www.darpa.mil/mto/stab/kickoff/stab_vic.pdf], Feb. 2003.
Alexander Wolter, "Studies on a High–Resolution Spatial Light Modulator with Deformable Surface Profile of a Liquid Film for Optical Pattern Generation", Jan. 24, 2001, pp. 1–2, Abstract only.
Junghoon Lee et al., "Surface Tension Driven Microactuation Based on Continuous Electrowetting (CEW)", pp. 1–25, retrieved from the Internet: [http://cjmems.seas.ucla.edu/papers/Junghoon_jmem_2000_text.pdf]and Figures 1–14, retrieved from the Internet: [http://cjmems.seas.ucla.edu/papers/Junghoon_jmem_2000_figure.pdf], Jan. 2000.

(Continued)

*Primary Examiner*—Karl Tamai

(57) ABSTRACT

A micro-mirror device includes a substrate, at least one electrode formed on the substrate, and a reflective element spaced from the substrate and extending beyond the at least one electrode. The reflective element is adapted to move between a first position and at least one second position, and, when the reflective element is in the at least one second position, a minimum distance between the reflective element and the at least one electrode is greater than a minimum distance between the reflective element and the substrate.

23 Claims, 7 Drawing Sheets

U.S. PATENT DOCUMENTS

| | | | |
|---|---|---|---|
| 5,665,997 A | | 9/1997 | Weaver et al. ............... 257/414 |
| 5,745,281 A | * | 4/1998 | Yi et al. ..................... 359/290 |
| 5,796,508 A | * | 8/1998 | Suzuki ....................... 359/224 |
| 5,959,338 A | | 9/1999 | Youngner et al. ........... 257/419 |
| 6,025,951 A | | 2/2000 | Swart et al. ................. 359/245 |
| 6,195,478 B1 | | 2/2001 | Fouquet ....................... 385/17 |
| 6,323,834 B1 | | 11/2001 | Colgan et al. ................. 345/84 |
| 6,404,942 B1 | | 6/2002 | Edwards et al. .............. 385/18 |
| 2001/0024556 A1 | | 9/2001 | Beguin et al. .............. 385/125 |

OTHER PUBLICATIONS

Chang–Jin "CJ" Kim, "Mems Devices Based on the Use of Surface Tension", 4 pgs., retrieved from the Internet: [http://cjmems.seas.ucla.edu/papers/CJ_ISDRS_99.pdf], Jan. 1999.

Chang–Jin Kim, "Microfluids Using the Surface Tension Force in Microscale", Aug. 2000, Proc. SPIE vol. 4177, Abstract only.

* cited by examiner

MICRO-MIRROR DEVICE WITH INCREASED MIRROR TILT

CROSS-REFERENCE TO RELATED APPLICATIONS

This application is related to U.S. patent application Ser. No. 10/136,719, filed on Apr. 30, 2002, assigned to the assignee of the present invention, and incorporated herein by reference.

THE FIELD OF THE INVENTION

The present invention relates generally to micro-actuators, and more particularly to a micro-mirror device.

BACKGROUND OF THE INVENTION

Micro-actuators have been formed on insulators or other substrates using micro-electronic techniques such as photolithography, vapor deposition, and etching. Such micro-actuators are often referred to as micro-electromechanical systems (MEMS) devices. An example of a micro-actuator includes a micro-mirror device. The micro-mirror device can be operated as a light modulator for amplitude and/or phase modulation of incident light. One application of a micro-mirror device is in a display system. As such, multiple micro-mirror devices are arranged in an array such that each micro-mirror device provides one cell or pixel of the display.

A conventional micro-mirror device includes an electrostatically actuated mirror supported for rotation about an axis of the mirror. As such, rotation of the mirror about the axis may be used to modulate incident light by directing the incident light in different directions. Preferably, the size of the micro-mirror device is minimized such that the density of an array of such devices can be maximized. As such, resolution of a display device incorporating the micro-mirror device can be increased since more micro-mirror devices can occupy a given area. To effectively direct the incident light in different directions, however, the angle of rotation or tilt of the mirror must be sufficient.

Accordingly, it is desired to increase rotation or tilt of the mirror of the micro-mirror device without having to increase a size of the micro-mirror device.

SUMMARY OF THE INVENTION

One aspect of the present invention provides a micro-mirror device. The micro-mirror device includes a substrate, at least one electrode formed on the substrate, and a reflective element spaced from the substrate and extending beyond the at least one electrode. The reflective element is adapted to move between a first position and at least one second position, and, when the reflective element is in the at least one second position, a minimum distance between the reflective element and the at least one electrode is greater than a minimum distance between the reflective element and the substrate.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
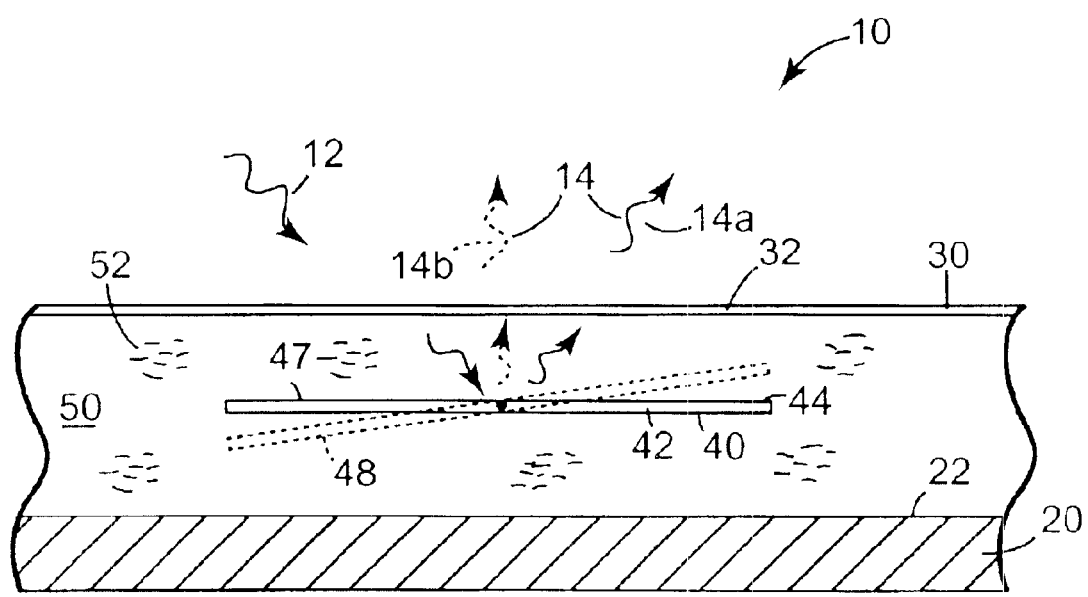
FIG. 1 is a schematic cross-sectional view illustrating one embodiment of a portion of a micro-mirror device according to the present invention.

FIG. 1 illustrates one embodiment of a micro-mirror device 10. Micro-mirror device 10 is a micro-actuator which relies on electrical to mechanical conversion to generate a force and cause movement or actuation of a body or element. In one embodiment, as described below, a plurality of micro-mirror devices 10 are arranged to form an array of micro-mirror devices. As such, the array of micro-mirror devices may be used to form a display. As such, each micro-mirror device 10 constitutes a light modulator for modulation of incident light and provides one cell or pixel of the display. In addition, micro-mirror device 10 may also be used in other imaging systems such as projectors and may also be used for optical addressing.

In one embodiment, micro-mirror device 10 includes a substrate 20, a plate 30, and an actuating element 40. Preferably, plate 30 is oriented substantially parallel to a surface 22 of substrate 20 and spaced from surface 22 so as to define a cavity 50 therebetween. Actuating element 40 is interposed between surface 22 of substrate 20 and plate 30. As such, actuating element 40 is positioned within cavity 50.

In one embodiment, actuating element 40 is actuated so as to move between a first position 47 and a second position 48 relative to substrate 20 and plate 30. Preferably, actuating element 40 moves or tilts at an angle about an axis of rotation. As such, first position 47 of actuating element 40 is illustrated as being substantially horizontal and substantially parallel to substrate 20 and second position 48 of actuating element 40 is illustrated as being oriented at an angle to first position 47. Movement or actuation of actuating element 40 relative to substrate 20 and plate 30 is described in detail below.

In one embodiment, cavity 50 is filled with a dielectric liquid 52 such that actuating element 40 is in contact with dielectric liquid 52. In one embodiment, cavity 50 is filled with dielectric liquid 52 such that actuating element 40 is submerged in dielectric liquid 52. Dielectric liquid 52, therefore, is disposed between actuating element 40 and substrate 20 and between actuating element 40 and plate 30. Thus, dielectric liquid 52 contacts or wets opposite surfaces of actuating element 40. In another embodiment, cavity 50 is filled with dielectric liquid 52 such that actuating element 40 is positioned above dielectric liquid 52 and at least a surface of actuating element 40 facing substrate 20 is in contact with dielectric liquid 52. Dielectric liquid 52 enhances actuation of actuating element 40, as described below.

Preferably, dielectric liquid 52 is transparent. As such, dielectric liquid 52 is clear or colorless in the visible spectrum. In addition, dielectric liquid 52 is chemically stable in electric fields, chemically stable with changes in temperature, and chemically inert. In addition, dielectric liquid 52 has a low vapor pressure and is non-corrosive. Furthermore, dielectric liquid 52 has a high molecular orientation in electric fields and moves in an electric field.

Preferably, dielectric liquid 52 has a low dielectric constant and a high dipole moment. In addition, dielectric liquid 52 is generally flexible and has pi electrons available. Examples of liquids suitable for use as dielectric liquid 52 include phenyl-ethers, either alone or in blends (i.e., 2, 3, and 5 ring), phenyl-sulphides, and/or phenyl-selenides. In one illustrative embodiment, examples of liquids suitable for use as dielectric liquid 52 include a polyphenyl ether (PPE) such as OS138 and olive oil.

Preferably, plate 30 is a transparent plate 32 and actuating element 40 is a reflective element 42. In one embodiment, transparent plate 32 is a glass plate. Other suitable planar translucent or transparent materials, however, may be used. Examples of such a material include quartz and plastic.

Reflective element 42 includes a reflective surface 44. In one embodiment, reflective element 42 is formed of a uniform material having a suitable reflectivity to form reflective surface 44. Examples of such a material include polysilicon or a metal such as aluminum. In another embodiment, reflective element 42 is formed of a base material such as polysilicon with a reflective material such as aluminum or titanium nitride disposed on the base material to form reflective surface 44. In addition, reflective element 42 may be formed of a non-conductive material or may be formed of or include a conductive material.

As illustrated in the embodiment of FIG. 1, micro-mirror device 10 modulates light generated by a light source (not shown) located on a side of transparent plate 32 opposite of substrate 20. The light source may include, for example, ambient and/or artificial light. As such, input light 12, incident on transparent plate 32, passes through transparent plate 32 into cavity 50 and is reflected by reflective surface 44 of reflective element 42 as output light 14. Thus, output light 14 passes out of cavity 50 and back through transparent plate 32.

The direction of output light 14 is determined or controlled by the position of reflective element 42. For example, with reflective element 42 in first position 47, output light 14 is directed in a first direction 14a. However, with reflective element 42 in second position 48, output light 14 is directed in a second direction 14b. Thus, micro-mirror device 10 modulates or varies the direction of output light 14 generated by input light 12. As such, reflective element 42 can be used to steer light into, and/or away from, an optical imaging system.

In one embodiment, first position 47 is a neutral position of reflective element 42 and represents an "ON" state of micro-mirror device 10 in that light is reflected, for example, to a viewer or onto a display screen, as described below. Thus, second position 48 is an actuated position of reflective element 42 and represents an "OFF" state of micro-mirror device 10 in that light is not reflected, for example, to a viewer or onto a display screen.

Figure 2:
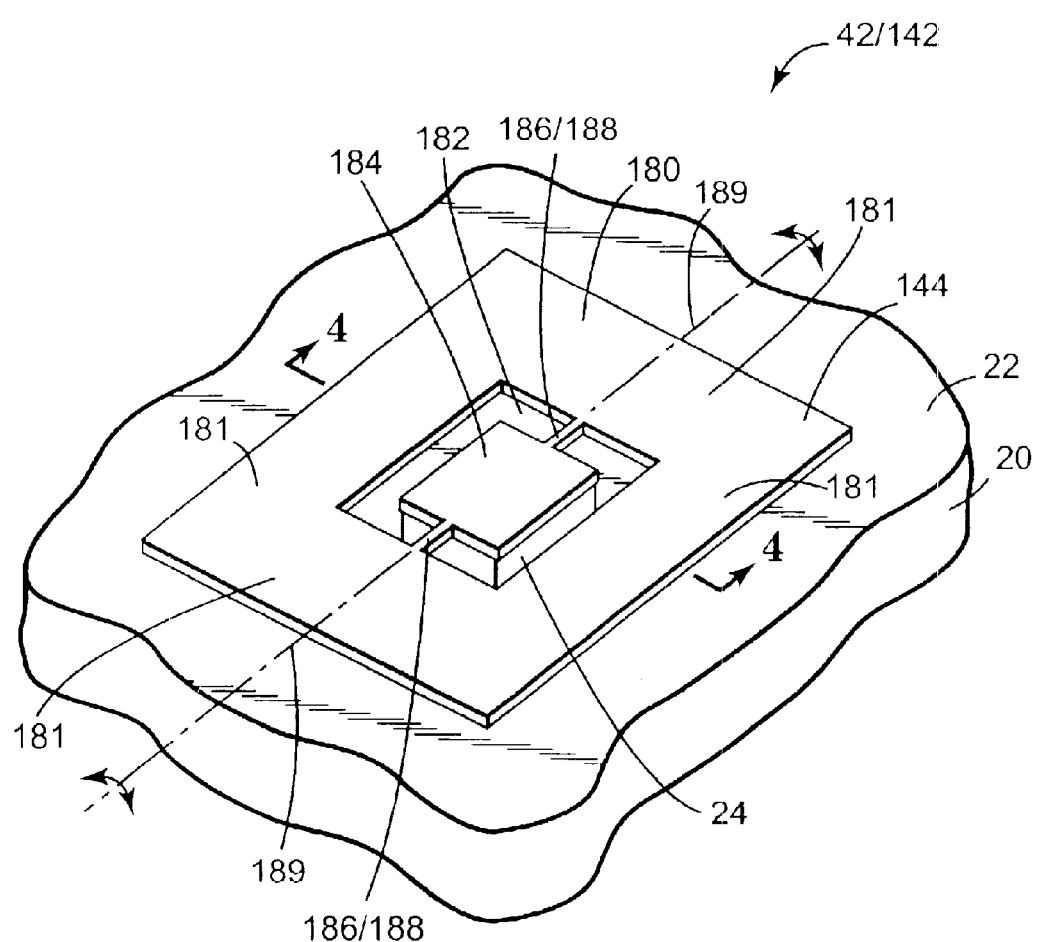
FIG. 2 is a perspective view illustrating one embodiment of a portion of a micro-mirror device according to the present invention.

FIG. 2 illustrates one embodiment of reflective element 42. Reflective element 142 has a reflective surface 144 and includes a substantially rectangular-shaped outer portion 180 and a substantially rectangular-shaped inner portion 184. In one embodiment, reflective surface 144 is formed on both outer portion 180 and inner portion 184. Outer portion 180 has four contiguous side portions 181 arranged to form a substantially rectangular-shaped opening 182. As such, inner portion 184 is positioned within opening 182. Preferably, inner portion 184 is positioned symmetrically within opening 182.

In one embodiment, a pair of hinges 186 extend between inner portion 184 and outer portion 180. Hinges 186 extend from opposite sides or edges of inner portion 184 to adjacent opposite sides or edges of outer portion 180. Preferably, outer portion 180 is supported by hinges 186 along an axis of symmetry. More specifically, outer portion 180 is supported about an axis that extends through the middle of opposed edges thereof. As such, hinges 186 facilitate movement of reflective element 142 between first position 47 and second position 48, as described above (FIG. 1). More specifically, hinges 186 facilitate movement of outer portion 180 between first position 47 and second position 48 relative to inner portion 184.

In one embodiment, hinges 186 include torsional members 188 having longitudinal axes 189 oriented substantially parallel to reflective surface 144. Longitudinal axes 189 are collinear and coincide with an axis of symmetry of reflective element 142. As such, torsional members 188 twist or turn about longitudinal axes 189 to accommodate movement of outer portion 180 between first position 47 and second position 48 relative to inner portion 184.

In one embodiment, reflective element 142 is supported relative to substrate 20 by a support or post 24 extending from surface 22 of substrate 20. More specifically, post 24 supports inner portion 184 of reflective element 142. As such, post 24 is positioned within side portions 181 of outer portion 180. Thus, outer portion 180 of reflective element 142 is supported from post 24 by hinges 186.

Figure 3:
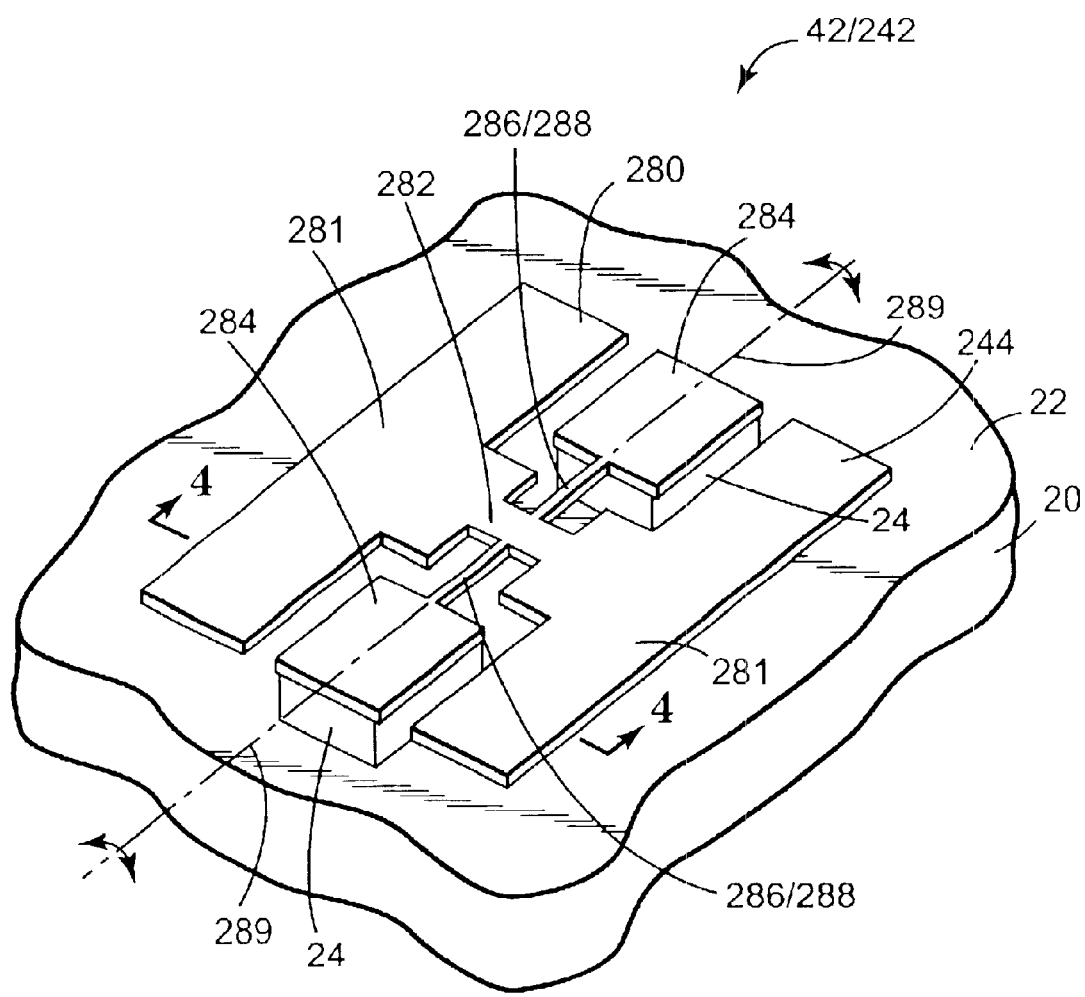
FIG. 3 is a perspective view illustrating another embodiment of a portion of a micro-mirror device according to the present invention.

FIG. 3 illustrates another embodiment of reflective element 42. Reflective element 242 has a reflective surface 244 and includes a substantially H-shaped portion 280 and a pair of substantially rectangular-shaped portions 284. In one embodiment, reflective surface 244 is formed on both H-shaped portion 280 and rectangular-shaped portions 284. H-shaped portion 280 has a pair of spaced leg portions 281 and a connecting portion 282 extending between spaced leg portions 281. As such, rectangular-shaped portions 284 are positioned on opposite sides of connection portion 282 between spaced leg portions 281. Preferably, rectangular-shaped portions 284 are positioned symmetrically to spaced leg portions 281 and connecting portion 282.

In one embodiment, hinges 286 extend between rectangular-shaped portions 284 and H-shaped portion 280. Hinges 286 extend from a side or edge of rectangular-shaped portions 284 to adjacent opposite sides or edges of connecting portion 282 of H-shaped portion 280. Preferably, H-shaped portion 280 is supported by hinges 286 along an axis of symmetry. More specifically, H-shaped portion 280 is supported about an axis that extends through the middle of opposed edges of connecting portion 282. As such, hinges 286 facilitate movement of reflective element 242 between first position 47 and second position 48, as described above (FIG. 1). More specifically, hinges 286 facilitate movement of H-shaped portion 280 between first position 47 and second position 48 relative to rectangular-shaped portions 284.

In one embodiment, hinges 286 include torsional members 288 having longitudinal axes 289 oriented substantially parallel to reflective surface 244. Longitudinal axes 289 are collinear and coincide with an axis of symmetry of reflective element 242. As such, torsional members 288 twist or turn about longitudinal axes 289 to accommodate movement of H-shaped portion 280 between first position 47 and second position 48 relative to rectangular-shaped portions 284.

In one embodiment, reflective element 242 is supported relative to substrate 20 by a pair of posts 24 extending from surface 22 of substrate 20. More specifically, posts 24 support rectangular-shaped portions 284 of reflective element 242. As such, posts 24 are positioned on opposite sides of connecting portion 282 between spaced leg portions 281. Thus, H-shaped portion 280 of reflective element 242 is supported from posts 24 by hinges 286.

Figure 4:
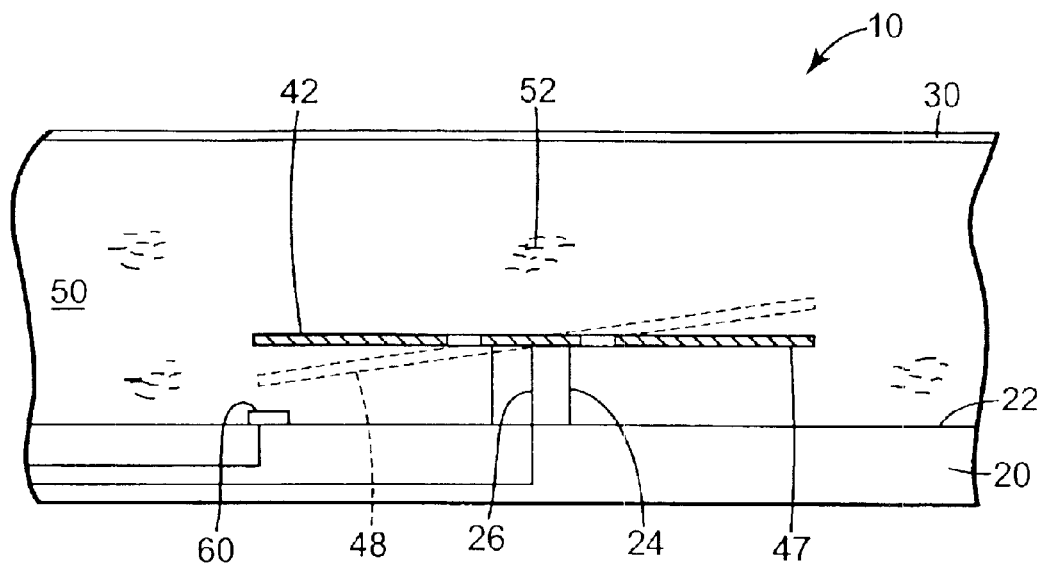
FIG. 4 is a schematic cross-sectional view taken along line 4—4 of FIGS. 2 and 3 illustrating one embodiment of actuation of a micro-mirror device according to the present invention.

FIG. 4 illustrates one embodiment of actuation of micro-mirror device 10. In one embodiment, reflective element 42 (including reflective elements 142 and 242) is moved between first position 47 and second position 48 by applying an electrical signal to an electrode 60 formed on substrate 20. In one embodiment, electrode 60 is formed on surface 22 of substrate 20 adjacent an end or edge of reflective element 42. Application of an electrical signal to electrode 60 generates an electric field between electrode 60 and reflective element 42 which causes movement of reflective element 42 between first position 47 and second position 48.

Preferably, dielectric liquid 52 is selected so as to respond to the electric field. More specifically, dielectric liquid 52 is selected such that the electric field aligns and moves polar molecules of the liquid. As such, dielectric liquid 52 moves in the electric field and contributes to the movement of reflective element 42 between first position 47 and second position 48 upon application of the electrical signal. Thus, with dielectric liquid 52 in cavity 50, dielectric liquid 52 enhances an actuation force acting on reflective element 42. More specifically, dielectric liquid 52 increases an actuation force on reflective element 42 as generated by a given activation energy. In addition, dielectric liquid 52 provides thermal management and/or cooling properties by dissipating heat developed within or absorbed by micro-mirror device 10. Heat may be developed within micro-mirror device 10 by movement of reflective element 42 and/or heat may be absorbed by micro-mirror device 10 by light impinged on reflective element 42.

Preferably, when the electrical signal is removed from electrode 60, reflective element 42 persists or holds second position 48 for some length of time. Thereafter, restoring forces of reflective element 42 including, for example, hinges 186 (FIG. 2) and hinges 286 (FIG. 3) pull or return reflective element 42 to first position 47.

In one embodiment, a conductive via 26 is formed in and extends through post 24. Conductive via 26 is electrically coupled to reflective element 42 and, more specifically, conductive material of reflective element 42. As such, reflective element 42 (including reflective elements 142 and 242) is moved between first position 47 and second position 48 by applying an electrical signal to electrode 60 and reflective element 42. More specifically, electrode 60 is energized to one polarity and the conductive material of reflective element 42 is energized to an opposite polarity.

Application of an electrical signal of one polarity to electrode 60 and an electrical signal of an opposite polarity to reflective element 42 generates an electric field between electrode 60 and reflective element 42 which causes movement of reflective element 42 between first position 47 and second position 48. Dielectric liquid 52 contributes to the movement of reflective element 42, as described above.

In another embodiment, reflective element 42 (including reflective elements 142 and 242) is moved between first position 47 and second position 48 by applying an electrical signal to reflective element 42. More specifically, the electrical signal is applied to conductive material of reflective element 42 by way of conductive via 26 through post 24. As such, application of an electrical signal to reflective element 42 generates an electric field which causes movement of reflective element 42 between first position 47 and second position 48. Dielectric liquid 52 contributes to the movement of reflective element 42, as described above.

Additional embodiments of actuation of micro-mirror device 10 are described, for example, in related U.S. patent application Ser. No. 10/136,719, assigned to the assignee of the present invention.

Figure 5:
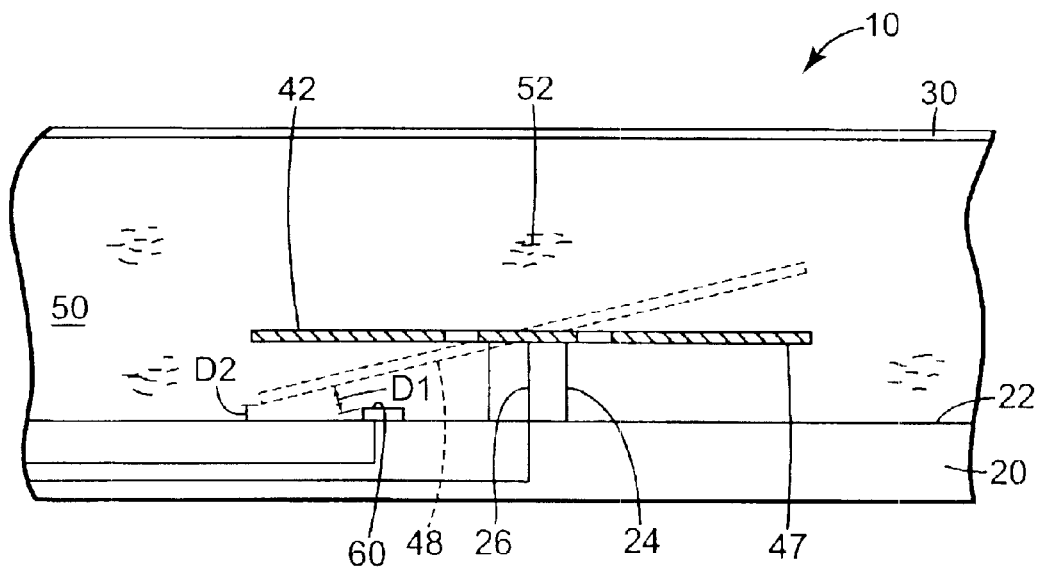
FIG. 5 is a schematic cross-sectional view illustrating another embodiment of a micro-mirror device according to the present invention.

FIG. 5 illustrates another embodiment of micro-mirror device 10. Similar to the embodiment illustrated in FIG. 4, reflective element 42 is moved between first position 47 and second position 48 by applying an electrical signal to electrode 60 formed on substrate 20 and/or conductive material of reflective element 42 by way of conductive via 26, as described above. As such, reflective element 42 is moved in a first direction.

However, compared to the embodiment illustrated in FIG. 4, in the embodiment illustrated in FIG. 5, electrode 60 is moved toward or positioned closer to post 24 and, therefore, the center of reflective element 42. As such, the end of reflective element 42 extends over and beyond electrode 60. Thus, an angle of rotation or tilt of reflective element 42 between first position 47 and second position 48 can be increased since reflective element 42 can be moved closer to substrate 20 without contacting electrode 60. Preferably, reflective element 42 is prevented from contacting electrode 60 so as to avoid arcing and loss of the actuation force between reflective element 42 and electrode 60 when reflective element 42 is conductive.

Preferably, electrode 60 is moved toward or positioned closer to post 24 such that when reflective element 42 is in second position 48, a minimum distance D1 defined between reflective element 42 and electrode 60 is greater than a minimum distance D2 defined between reflective element 42 and substrate 20. Minimum distance D2, therefore, is defined between reflective element 42 and surface 22 of substrate 20. Thus, with minimum distance D1 being greater than minimum distance D2, reflective element 42 is prevented from contacting electrode 60 when reflective element 42 is in second position 48.

Figure 6:
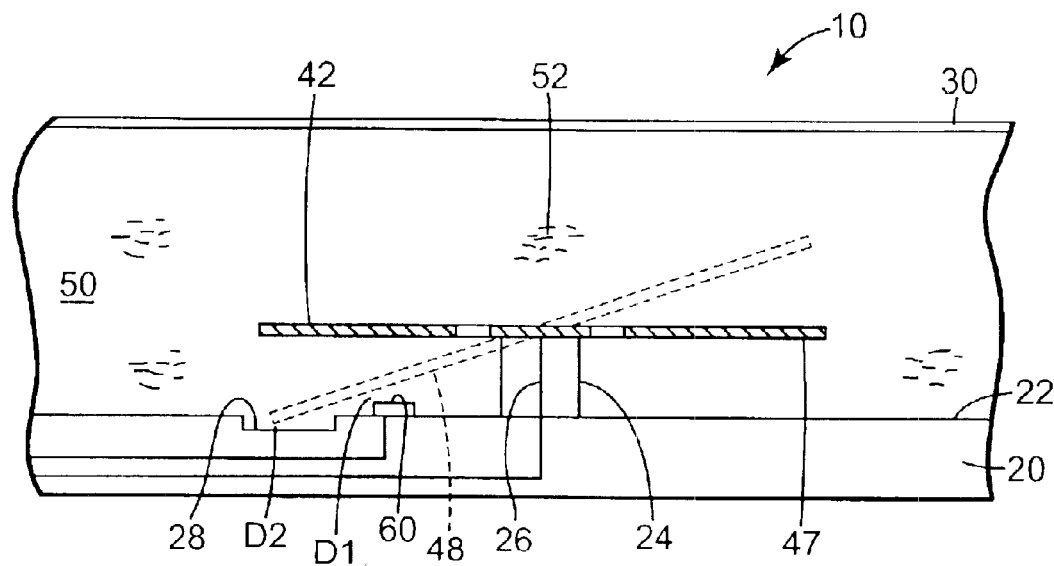
FIG. 6 is a schematic cross-sectional view illustrating another embodiment of a micro-mirror device according to the present invention.

FIG. 6 illustrates another embodiment of micro-mirror device 10. Similar to the embodiment illustrated in FIG. 5, electrode 60 is moved toward or positioned closer to post 24. In addition, reflective element 42 is moved between first position 47 and second position 48 by applying an electrical signal to electrode 60 formed on substrate 20 and/or conductive material of reflective element 42 by way of conductive via 26, as described above. As such, reflective element 42 is moved in a first direction.

However, in the embodiment illustrated in FIG. 6, a trench 28 is formed in substrate 20. Trench 28 is positioned such that an end of reflective element 42 extends over trench 28. As such, the angle of rotation or tilt of reflective element 42 between first position 47 and second position 48 can be further increased since the end of reflective element 42 can be positioned in trench 28 when reflective element 42 is in second position 48. Accordingly, the end of reflective element 42 can be moved through and beyond a plane coinciding with surface 22 of substrate 20 when reflective element 42 is rotated or tilted to second position 48.

Preferably, trench 28 is formed in substrate 20 and electrode 60 is positioned on substrate 20 such that when reflective element 42 is in second position 48, minimum distance D1 defined between reflective element 42 and electrode 60 is greater than minimum distance D2 defined between reflective element 42 and substrate 20. Minimum distance D2, however, is defined between reflective element 42 and trench 28 of substrate 20. Thus, with minimum distance D1 being greater than minimum distance D2, reflective element 42 is prevented from contacting electrode 60 when reflective element 42 is in second position 48.

Figure 7:
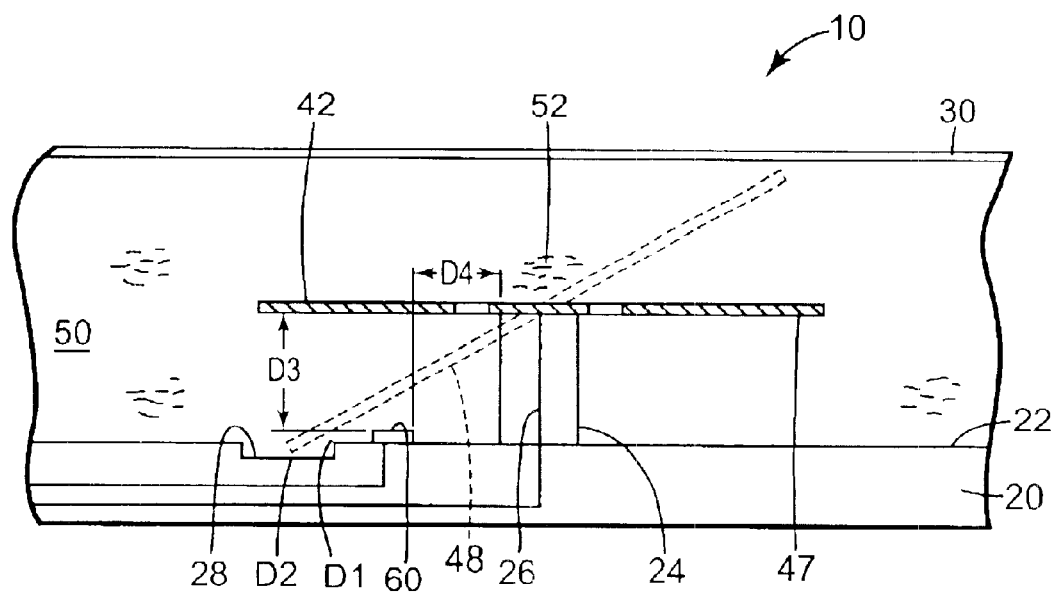
FIG. 7 is a schematic cross-sectional view illustrating another embodiment of a micro-mirror device according to the present invention.

FIG. 7 illustrates another embodiment of micro-mirror device 10. Similar to the embodiment illustrated in FIG. 6, electrode 60 is moved toward or positioned closer to post 24 and substrate 20 has trench 28 formed therein. In addition, reflective element 42 is moved between first position 47 and second position 48 by applying an electrical signal to electrode 60 formed on substrate 20 and/or conductive material of reflective element 42 by way of conductive via 26, as described above. As such, reflective element 42 is moved in a first direction.

However, compared to the embodiment illustrated in FIG. 6, in the embodiment illustrated in FIG. 7, a height of post 24 is increased such that a distance between reflective element 42 and substrate 20 is increased. As such, the angle of rotation or tilt of reflective element 42 between first position 47 and second position 48 can be further increased.

Preferably, the height of post 24 is selected such that when reflective element 42 is in first position 47, a distance D3 defined between electrode 60 and reflective element 42 is greater than a distance D4 as defined along substrate 20 between electrode 60 and post 24. Thus, with distance D3 being greater than distance D4, reflective element 42 is prevented from contacting electrode 60 when reflective element 42 is in second position 28. In addition, minimum distance D1 defined between reflective element 42 and electrode 60 is greater than minimum distance D2 defined between reflective element 42 and substrate 20.

Figure 8:
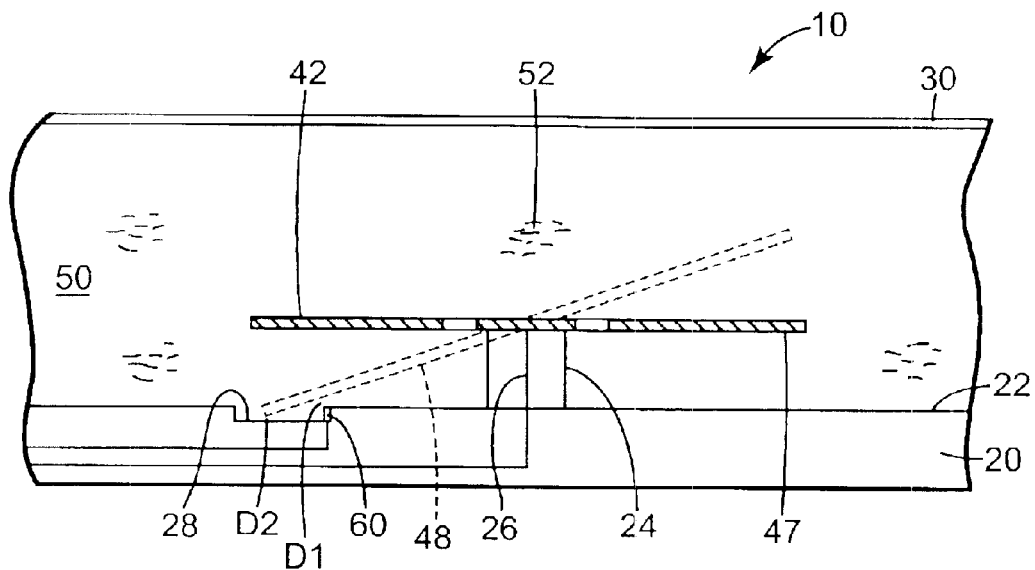
FIG. 8 is a schematic cross-sectional view illustrating another embodiment of a micro-mirror device according to the present invention.

FIG. 8 illustrates another embodiment of micro-mirror device 10. Similar to the embodiment illustrated at FIG. 6, substrate 20 has trench 28 formed therein. In addition, reflective element 42 is moved between first position 47 and second position 48 by applying an electrical signal to electrode 60 formed on substrate 20 and/or conductive material of reflective element 42 by way of conductive via 26, as described above. As such, reflective element 42 is moved in a first direction.

However, in the embodiment illustrated in FIG. 8, electrode 60 is formed on substrate 20 within trench 28 of substrate 20. In one illustrative embodiment, electrode 60 is formed along a sidewall of trench 28. By forming electrode 60 within trench 28, less force can be used to move reflective element 42 since electrode 60 can be positioned closer to the edge of reflective element 42 and an effective lever arm of reflective element 42 can be maximized.

Preferably, as described above with reference to FIG. 6, trench 28 is formed in substrate 20 and electrode 60 is positioned on substrate 20 such that when reflective element 42 is in second position 48, minimum distance D1 defined between reflective element 42 and electrode 60 is greater than minimum distance D2 defined between reflective element 42 and substrate 20. In addition, minimum distance D2 is defined between reflective element 42 and trench 28 of substrate 20. Thus, with minimum distance D1 being greater than minimum distance D2, reflective element 42 is prevented from contacting electrode 60 when reflective element 42 is in second position 48.

Figure 9:
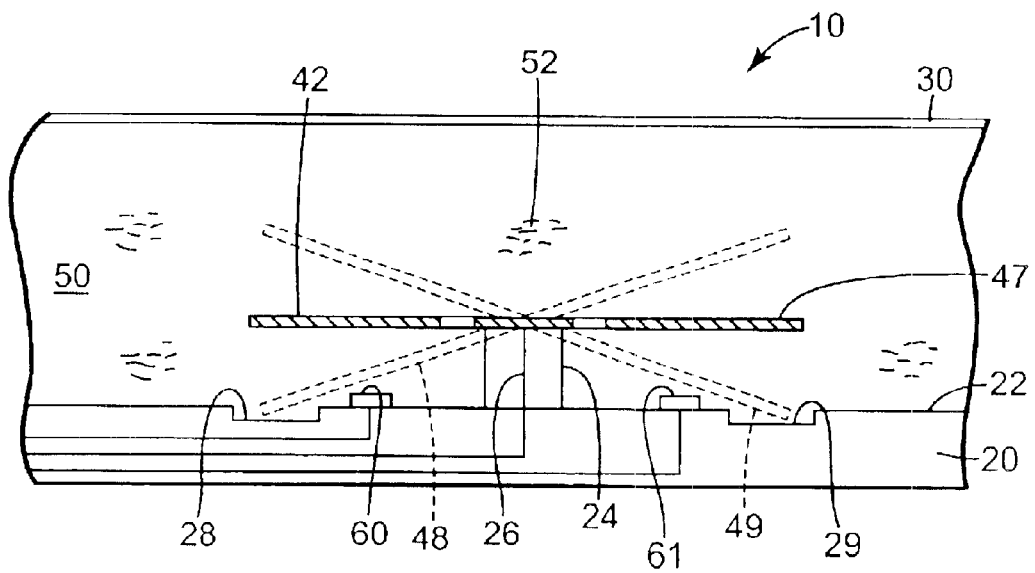
FIG. 9 is a schematic cross-sectional view illustrating another embodiment of a micro-mirror device according to the present invention.

FIG. 9 illustrates another embodiment of micro-mirror device 10. Similar to the embodiment illustrated in FIG. 6, electrode 60 is moved toward or positioned closer to post 24 and substrate 20 has trench 28 formed therein. In addition, reflective element 42 is moved between first position 47 and second position 48 by applying an electrical signal to electrode 60 formed on substrate 20 and/or conductive material of reflective element 42 by way of conductive via 26, as described above. As such, reflective element 42 is moved in a first direction.

However, in the embodiment illustrated in FIG. 9, an electrode 61 is formed on substrate 20 and a trench 29 is formed in substrate 20 on an opposite side of post 24. As such, a first end of reflective element 42 extends beyond electrode 60 and over trench 28 and an opposite end of reflective element 42 extends beyond electrode 61 and over trench 29. Thus, reflective element 42 is also moved in a second direction opposite the first direction. More specifically, reflective element 42 is moved between first position 47 and a third position 49 oriented at an angle to first position 47 by applying an electrical signal to electrode 61. Thus, an opposite end of reflective element 42 can be positioned in trench 29 when reflective element 42 is in third position 49. Accordingly, the opposite end of reflective element 42 can be moved through and beyond a plane coinciding with surface 22 of substrate 20 when reflective element 42 is rotated or tilted to third position 49.

Figure 10:
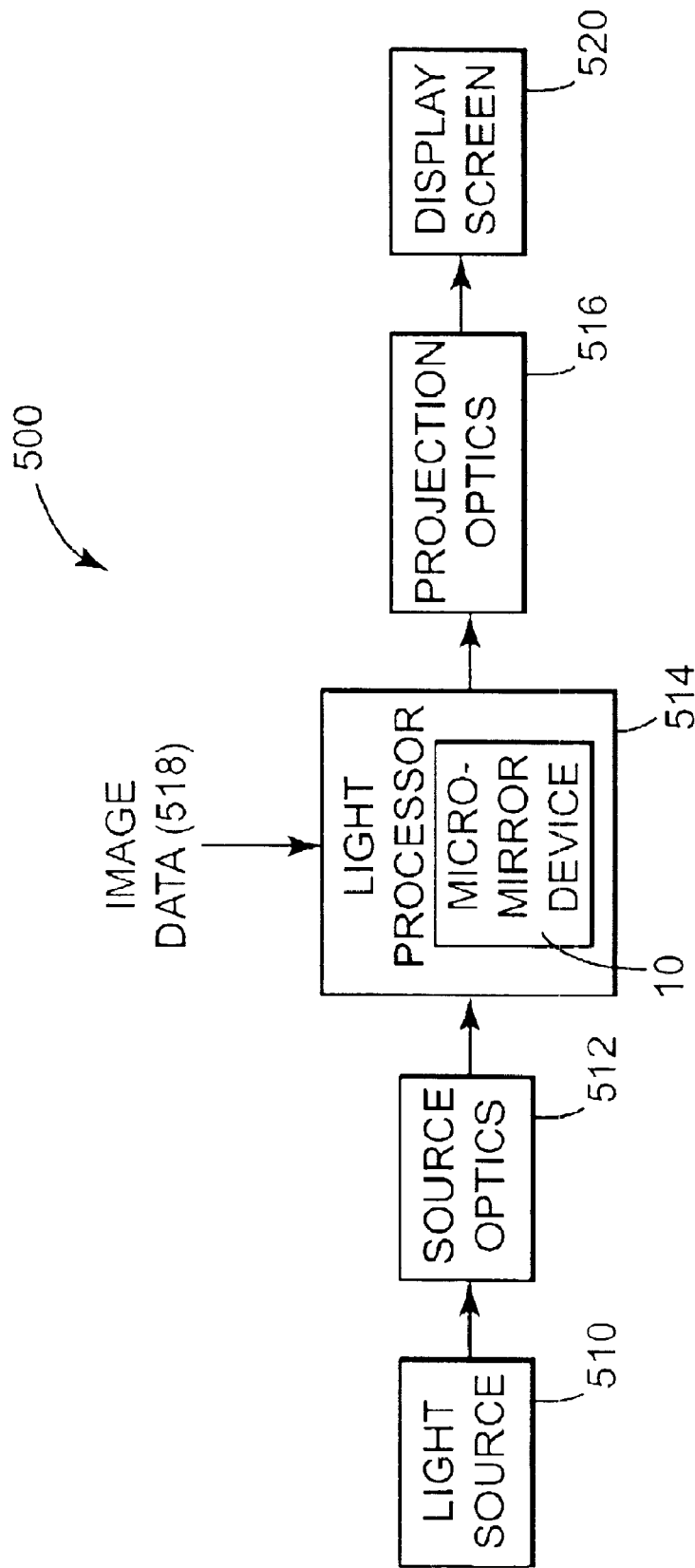
FIG. 10 is a block diagram illustrating one embodiment of a display system including a micro-mirror device according to the present invention.

In one embodiment, as illustrated in FIG. 10, micro-mirror device 10 is incorporated in a display system 500. Display system 500 includes a light source 510, source optics 512, a light processor or controller 514, and projection optics 516. Light processor 514 includes multiple micro-mirror devices 10 arranged in an array such that each micro-mirror device 10 constitutes one cell or pixel of the display. The array of micro-mirror devices 10 may be formed on a common substrate with separate cavities and/or a common cavity for the reflective elements of the multiple micro-mirror devices 10.

In one embodiment, light processor 514 receives image data 518 representing an image to be displayed. As such, light processor 514 controls the actuation of micro-mirror devices 10 and the modulation of light received from light source 510 based on image data 518. The modulated light is then projected to a viewer or onto a display screen 520.

By positioning or moving electrode 60 (including electrode 61) toward post 24, forming trench 28 (including trench 29) in substrate 20, and/or increasing a height of post 24, an angle of rotation or tilt of reflective element 42 between first position 47 and second position 48 (or third position 49) can be increased. By increasing the angle of rotation or tilt of reflective element 42, incident light can be more effectively modulated between being directed completely on and completely off the projection optics of the display device. As such, a contrast ratio of the display device can be increased. In addition, with an increased angle of rotation or tilt of reflective element 42, the projection optics can be moved closer to the array of micro-mirror devices since the micro-mirror devices can modulate the incident light over a larger distance. Moving the projection optics closer to the array of micro-mirror devices can reduce the size and, therefore, price of the display device. Furthermore, with an increased angle of rotation or tilt of reflective element 42, incident light need not be as collimated since the micro-mirror devices can modulate the incident light over a larger distance. Thus, a less expensive light source may be used in the display device.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A micro-mirror device, comprising:
   a substrate having a surface and at least one trench formed therein, the at least one trench having a sidewall oriented substantially perpendicular to the surface of the substrate;
   at least one electrode formed within the at least one trench along the sidewall thereof; and
   a reflective element spaced from the substrate and extending beyond the at least one electrode,
   wherein the reflective element is adapted to move between a first position and at least one second position, and
   wherein, when the reflective element is in the at least one second position, a minimum distance between the reflective element and the at least one electrode is greater than a minimum distance between the reflective element and the substrate.

2. The device of claim 1, wherein the at least one second position of the reflective element is oriented at an angle to the first position.

3. The device of claim 1, wherein the reflective element extends over the at least one trench, and wherein an end of the reflective element is adapted to be positioned in the at least one trench when the reflective element is in the at least one second position.

4. The device of claim 1, wherein, when the reflective element is in the at least one second position, the minimum distance between the reflective element and the substrate is defined between the reflective element and the at least one trench.

5. The device of claim 1, further comprising:
   at least one post extending from the substrate and supporting the reflective element,
   wherein, when the reflective element is in the first position, a distance between the at least one electrode and the reflective element is greater than a distance between the at least one electrode and the at least one post as defined along the substrate.

6. The device of claim 5, further comprising:
   a conductive via extending through the at least one post and electrically coupled to the reflective element.

7. The device of claim 1, wherein the reflective element is adapted to move in response to application of an electrical signal to the at least one electrode.

8. The device of claim 1, further comprising:
   a plate spaced from and oriented substantially parallel to the substrate, wherein the reflective element is interposed between the substrate and the plate, and the plate and the substrate define a cavity therebetween; and
   a dielectric liquid disposed in the cavity.

9. A display device including the micro-mirror device of claim 1.

10. A method of forming a micro-mirror device, the method comprising:
    providing a substrate, including forming at least one trench in the substrate with the at least one trench having a sidewall oriented substantially perpendicular to a surface of the substrate;
    forming at least one electrode within the at least one trench along the sidewall thereof; and
    spacing a reflective element from the substrate, including extending the reflective element beyond the at least one electrode,
    wherein the reflective element is adapted to move between a first position and at least one second position, and
    wherein, when the reflective element is in the at least one second position, a minimum distance between the reflective element and the at least one electrode is greater than a minimum distance between the reflective element and the substrate.

11. The method of claim 10, wherein the at least one second position of the reflective element is oriented at an angle to the first position.

12. The method of claim 10,
    wherein spacing the reflective element from the substrate further includes extending the reflective element over the at least one trench, and wherein an end of the reflective element is adapted to be positioned in the at least one trench when the reflective element is in the at least one second position.

13. The method of claim 10, wherein, when the reflective element is in the at least one second position, the minimum distance between the reflective element and the substrate is defined between the reflective element and the at least one trench.

14. The method of claim 10, further comprising:
    extending at least one post from the substrate,
    wherein spacing the reflective element from the substrate includes supporting the reflective element from the at least one post, and
    wherein, when the reflective element is in the first position, a distance between the at least one electrode and the reflective element is greater than a distance between the at least one electrode and the at least one post as defined along the substrate.

15. The method of claim 14, further comprising:

extending a conductive via through the at least one post and electrically coupling the conductive via with the reflective element.

16. The method of claim 10, wherein the reflective element is adapted to move in response to application of an electrical signal to the at least one electrode.

17. The method of claim 10, further comprising:

orienting a plate substantially parallel to the substrate and spacing the plate from the substrate, including defining a cavity between the plate and the substrate; and disposing a dielectric liquid in the cavity, wherein spacing the reflective element from the substrate includes interposing the reflective element between the substrate and the plate.

18. A micro-actuator, comprising:

a substrate having a surface and at least one trench formed therein, the at least one trench having a sidewall oriented substantially perpendicular to the surface of the substrate;

at least one electrode formed within the at least one trench along the sidewall thereof;

an actuating element spaced from the substrate; and means for moving the actuating element between a first position and at least one second position, wherein, when the actuating element is in the at least one second position, a minimum distance between the actuating element and the at least one electrode is greater than a minimum distance between the actuating element and the substrate.

19. The micro-actuator of claim 18, wherein means for moving the actuating element includes means for moving the actuating element through an angle between the first position and the at least one second position.

20. The micro-actuator of claim 19, means for moving the actuating element includes means for increasing the angle between the first position and the at least one second position for a given distance between the actuating element and the substrate.

21. The micro-actuator of claim 18, wherein means for moving the actuating element includes means for moving an end of the actuating element through a plane coinciding with the surface of the substrate.

22. The micro-actuator of claim 18, further comprising:

means for supporting the actuating element from the substrate, wherein, when the actuating element is in the first position, a distance between the at least one electrode and the actuating element is greater than a distance between the at least one electrode and the means for supporting the actuating element as defined along the substrate.

23. The micro-actuator of claim 18, further comprising:

a plate spaced from and oriented substantially parallel to the substrate;

wherein the actuating element is interposed between the substrate and the plate, and the plate and the substrate define a cavity therebetween, and wherein means for moving the actuating element includes a dielectric liquid disposed in the cavity.

* * * * *